United States Patent [19]

Escott et al.

[11] 4,281,032

[45] Jul. 28, 1981

[54] METHOD FOR COATING MOLD

[75] Inventors: Barnee M. Escott, Austin, Tex.; Jerald J. Reynolds, Swanton; William C. Ward, Burlington, both of Vt.

[73] Assignee: International Business Machines Corporation, Armonk, N.Y.

[21] Appl. No.: 104,475

[22] Filed: Dec. 17, 1979

[51] Int. Cl.³ .............................................. B29C 1/04
[52] U.S. Cl. ................................. 427/135; 106/38.22; 264/338; 427/318
[58] Field of Search ......................... 106/38.22, 38.24; 427/135, 318; 560/55; 264/338

[56] References Cited

PUBLICATIONS

Vandenburg et al., "Aromatic Acids of Carnauba Wax", *Jour. Amer. Oil Chemist Soc.*, vol. 44, No. 11, p. 659.

Vandenburg et al., "The Structural Constituents of Carnauba Wax", *Jour. Amer. Oil Chemist Soc.*, vol. 47, No. 12, p. 514.

*Primary Examiner*—Lorenzo B. Hayes
*Attorney, Agent, or Firm*—William N. Hogg

[57] ABSTRACT

Carnauba wax is contacted with perchloroethylene which will extract para methoxy cinnamic acid esters. The extracted solution is sprayed into the heated mold cavity. The solvent will evaporate leaving a coating of the para methoxy cinnamic acid ester on the mold.

5 Claims, No Drawings

METHOD FOR COATING MOLD

BACKGROUND OF THE INVENTION

This invention relates generally to plastic molding, and more particularly to mold release agents, a method of extracting of such mold release agents from starting material, and a method of utilizing such release agents on molds for molding plastic parts.

In many molding operations wherein plastic parts are molded, it is necessary to utilize a mold release agent. Mold release agents are applied to the mold to prevent sticking of the plastic parts to the mold cavity walls. The release agents are applied periodically after a predetermined number of shots have been made.

In a typical transfer molding operation of novalac plastic parts, carnauba wax is used as the mold release agent. A block or stick of the carnauba wax is rubbed onto the heated (175° C.) mold surfaces and then a brush is used to spread the carnauba wax over the surface of the mold. This process has several drawbacks.

First, it is necessary to run four or five shots of material after the application of the wax to make sure that there is no excess of wax present which can contribute to a poor surface quality and cause flakes of wax to become entrapped in the molded parts. These shots can be of novalac but more typically they are of a melamine material which acts as a good cleaning agent. In any event, these do not produce usable parts and the so molded parts must be scrapped.

After these cleaning shots, parts are molded. The duration of the mold release action is only about 10 to 20 shots, at which time the wax has to be re-applied and the whole cycle repeated. This is a costly and inefficient operation.

SUMMARY OF THE INVENTION

According to the present invention, para methoxy cinnamic acid esters are extracted from carnauba wax with a solvent and so the extracted esters in the solvent are sprayed onto a heated mold for plastic parts. In this technique, only a single cleaning shot is necessary and 200 to 250 shots, or more, can be run before a re-application of the release material is required.

DESCRIPTION OF THE PREFERRED EMBODIMENTS

According to this invention para methoxy cinnamic acid esters are extracted from carnauba wax with a solvent, the supernatant decanted, and then sprayed onto the mold surface as a mold release agent.

In a preferred embodiment, carnauba wax is treated with a non-polar solvent, specifically perchloroethylene is the preferred solvent. The solvent is heated to just below its boiling point, i.e., about 121° C. for perchloroethylene, and is brought into contact with the carnauba wax. This will cause an extraction from the carnauba wax of para methoxy cinnamic acid esters, which esters will be described in more detail presently. After the extraction has been completed, normally after about 15 minutes, then the supernatant is cooled and decanted. This material, i.e., para methoxy cinnamic acid esters in the perchloroethylene, constitutes the mold release material.

The mold release material constituted of esters dissolved in a solvent, is then sprayed onto the mold cavity surfaces by any conventional spray means. Preferably, the mold surface is heated to a temperature above the boiling point of the solvent. It is conventional practice, in any event, to heat the mold surface and the conventional temperature of approximately 175° C. for transfer molding of novalac plastics is a suitable temperature. This high temperaure causes a rapid evaporation of the solvent leaving a thin even coating of the ester on the mold surface. This even coating acts as the mold release agent. By simple routine experiment it can be easily determined the amount of solvent containing ester which should be sprayed onto the mold. This will depend to a certain extent on the type of molding operation, the size of the mold, the concentration of the ester in the solvent, and other similar factors.

The mold release agent as extracted above, i.e., a supernatant containing the para methoxy cinnamic acid ester extracted in hot perchloroethylene was used in a transfer molding process wherein novalac plastic parts were molded. The material was sprayed onto the mold surfaces which were heated to about 175° C. The perchloroethylene solvent quickly evaporated leaving a thin coating of the ester on the surface of the molds. A single shot of melamine was utilized to clean the mold's surface. Following this single cleaning shot of melamine, it was possible to start molding novalac plastic parts which had acceptable surface quality. It was found under an extended operation that between 200 and 250 novalac plastic shots could be made with acceptable surface quality before it was necessary to reapply the release agent and in each case after the reapplication of the release agent only one cleaning shot was necessary after which an additional 200 to 250 shots could be run with acceptable surface quality.

The prior art practice of rubbing carnauba wax onto the mold cavity surface and then brushing it over the surface was performed during extended operations. In this prior art practice it was often necessary to use up to five cleaning shots of melamine before molding of novalac parts could begin. Typically, the mold release action would last only from 10 to 20 shots after which it would have to be re-applied and the cleaning shots done again.

The extracted ester contains a cinnamic acid group and an aliphatic ester group. The cinnamic acid group has been identified as:

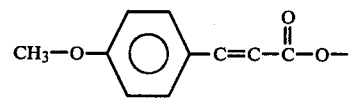

This agress with the identification in Vandenburg and Wilder paper, "Aromatic Acids of Carnauba Wax", *Journal of the American Oil Chemists'Society*, Vol. 44, No. 11, pp. 659–662. Although the article indicates that carnauba wax also contains para hydroxy substituted as well as methoxy substituted cinnamic esters, such hydroxy substituted components were not identified in the instant case. Although the reason for this is not completely understood, it is believed that this is due to the fact that nonpolar solvent perchloroethylene strongly solvates the non-polar methoxy constituent but not the polar hydroxy constituent. In any event, the ester which is extracted in the instant invention is the methoxy ester.

The aliphatic group shown in said article is:

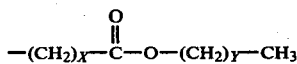

wherein X plus and Y equals about 58. Tests indicate that this appears to be essentially what the ester group is in the instant case in that there are chain aliphatics and

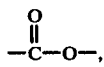

although there appears to be some degree of unsaturation and in some cases more than one

group. Hence, the ester group is a long chain aliphatic having at least one

group and having at least some unsaturation which can be expressed by the general formula of the more general formula:

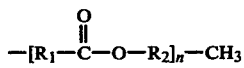

wherein $R_1$ and $R_2$ are linear aliphatic carbon chains saturated or unsaturated, wherein n is equal to at least 1, and wherein the total carbon atoms in the radical taken n times equal to about 58.

Thus, the general formula is:

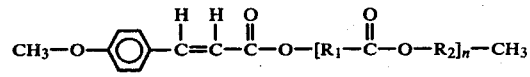

wherein $R_1$ and $R_2$ and n are as defined above. This appears to be the general formula. However, the para methoxy cinnamic acid ester, whatever its specific configuration of the ester group, is that which is extracted by the non-polar solvent, and in particular the perchloroethylene.

What is claimed is:

1. A method of improving the release properties of a mold for plastic parts comprising the steps of:
contacting carnauba wax with a solvent to dissolve the para methoxy cinnamic acid ester in said wax, decanting the solution of said dissolved ester and spraying said solution onto the mold prior to molding of said parts.

2. The invention as defined in claim 1 wherein the ester has the general formula:

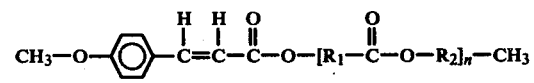

wherein $R_1$ and $R_2$ are linear aliphatic carbon chains saturated or unsaturated, wherein n is equal to at least 1, and wherein the total carbon atoms in the radical taken n times equal to about 58.

3. The invention as defined in claim 1 wherein the solvent is non-polar.

4. The invention as defined in claim 1 wherein the solvent is perchloroethylene.

5. The method of claim 1 wherein the mold is heated above the boiling point of the solvent.

* * * * *